Figure 1:
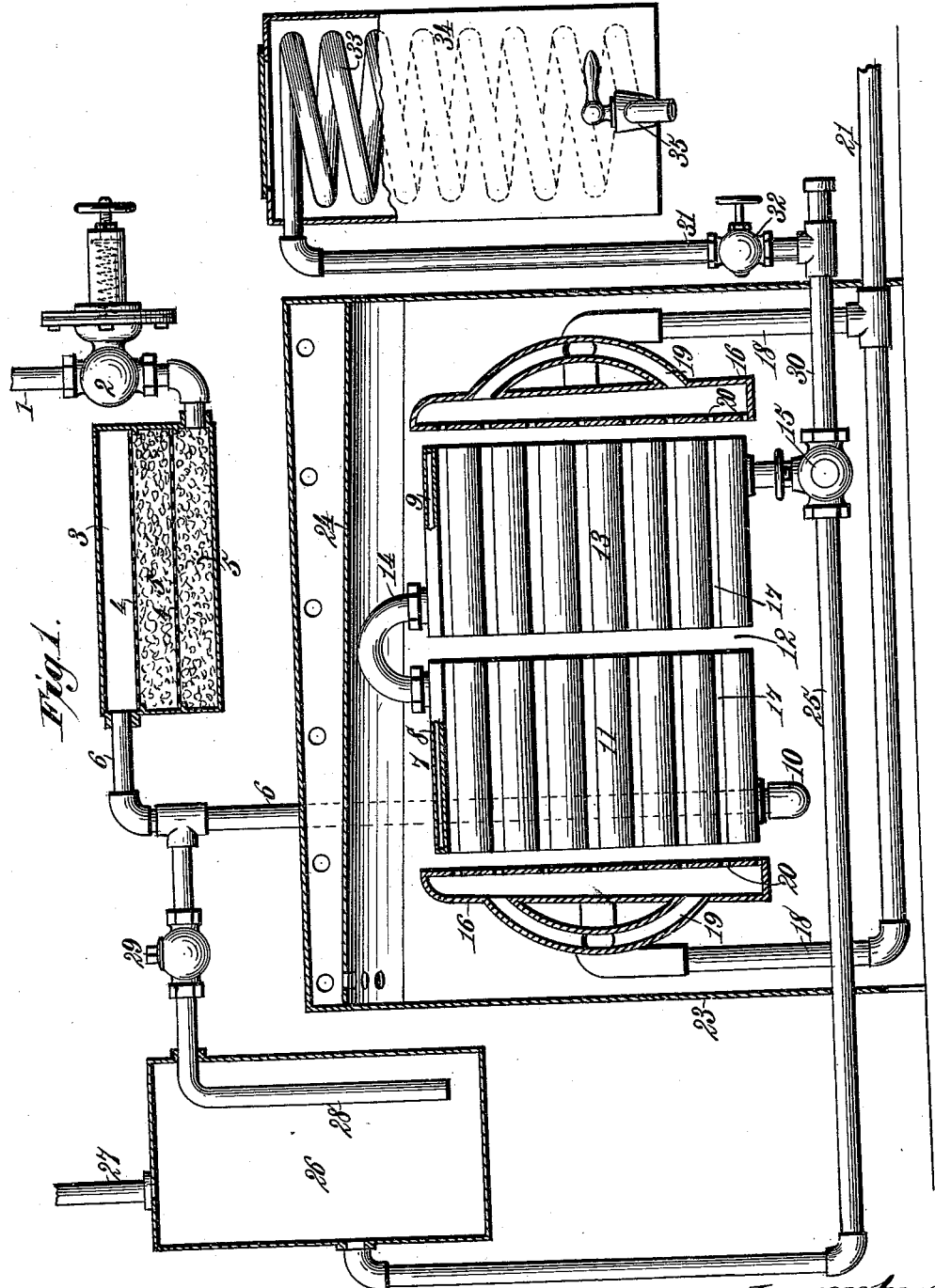

(No Model.) 2 Sheets—Sheet 1.

J. E. PRUNTY.
APPARATUS FOR RAPID HEATING AND PURIFICATION OF WATER.

No. 555,019. Patented Feb. 18, 1896.

Witnesses
Robert Everett
Thos. A. Gunn

Inventor
John E. Prunty
By James L. Norris
Atty.

(No Model.) 2 Sheets—Sheet 2.
J. E. PRUNTY.
APPARATUS FOR RAPID HEATING AND PURIFICATION OF WATER.
No. 555,019. Patented Feb. 18, 1896.
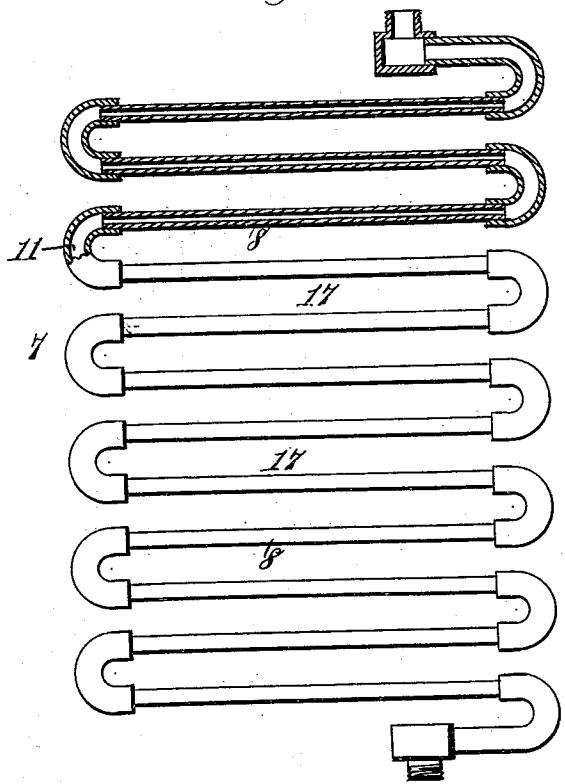
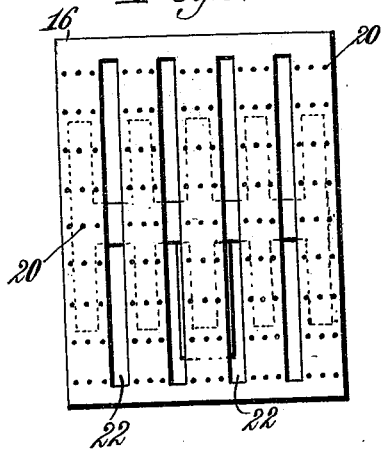
Witnesses.
Robert Everitt,
Thos. A. Gwin
Inventor:
John E. Prunty.
By James L. Norris,
Atty

UNITED STATES PATENT OFFICE.

JOHN EDWARD PRUNTY, OF BALTIMORE, MARYLAND, ASSIGNOR TO THE COURTLAND MACHINE COMPANY OF BALTIMORE CITY, OF SAME PLACE.

APPARATUS FOR RAPID HEATING AND PURIFICATION OF WATER.

SPECIFICATION forming part of Letters Patent No. 555,019, dated February 18, 1896.

Application filed December 21, 1895. Serial No. 572,881. (No model.)

*To all whom it may concern:*

Be it known that I, JOHN EDWARD PRUNTY, a citizen of the United States, residing at Baltimore, in the State of Maryland, have invented new and useful Improvements in Apparatus for the Rapid Heating and Purification of Water, of which the following is a specification.

My invention relates to apparatus for the rapid heating and purification of water and its distribution for required domestic uses and other purposes.

A principal object of the invention is the provision of portable, economical and efficient means for effecting filtration of a regulated supply of water and its subsequent rapid heating to any required temperature, preferably by employment of Bunsen gas-burners arranged for the production of a powerful draft of hot air around and adjacent to shallow and circuitous water-heating passages presenting extended heating-surfaces and constructed to expose the water in films of slight depths to the action of the heating medium. By means of suitable cocks and pipes a portion of the filtered, heated and purified water may be distributed for use wherever hot water is required, as in a bath-tub, or may be caused to rise to any required elevation, and another portion of the purified water may be artificially cooled or refrigerated for drinking purposes.

The invention consists in features of construction and novel combinations in a water filtering, heating, distributing and cooling apparatus, as hereinafter described and claimed.

In the annexed drawings, illustrating the invention, Figure 1 is a sectional elevation of my improved apparatus for the filtration, heating, purification, distribution, and cooling of water. Fig. 2 is a sectional elevation of the heater at a right angle to the preceding figure. Fig. 3 is a detail view of one of the burners for the heater.

Referring to the drawings, the numeral 1 designates a water-supply pipe provided with a reducing-valve 2 and connecting the water-pipes in a building with a filter 3, which may be of any suitable or approved construction. The filter 3 may comprise a casing or chamber fitted with perforated plates 4 and layers 5 of any well-known filtering material or materials. The inlet-pipe 1 is preferably connected with a lower compartment of the filter, as shown, so that the water will be filtered upward after depositing its grosser impurities. From the upper compartment of the filter a pipe 6 is extended to connect with the lower portion of a water-heater 7, comprising ascending and descending series of shallow and circuitous water-passages 8 and 9 constructed to expose the circulating water in thin films to the largely-extended heating-surfaces afforded by the walls of said passages.

The lower end of the pipe 6, leading from the filter, is connected, preferably, by a bend or elbow 10 with the bottom of the lower one of a vertical series of water-passages 8 that are spaced apart and arranged horizontally one above another to any required height. These water-passages 8 are connected at their alternate ends by bends 11 that are of the same width as the series of horizontal passages, and form therewith a continuous manifold for circulation of the water to be heated. Parallel with the vertical series of water-heating passages 8 and separated therefrom by a central flue or heated-air passage 12 is another vertical series of horizontal water-heating passages 9, connecting at alternate ends by bends 13 and of the same construction as the first-described series of water-heating passages.

The walls of the spaced-apart water-heating passages 8 and 9 and connecting bends 11 and 13 are preferably constructed of thin sheet-copper, and the several water-heating passages are quite shallow and have considerable lateral extension, so that the water will circulate in films and at the same time be exposed to extensive heating-surfaces.

The water that rises through the ascending series of horizontally disposed and shallow heating-passages 8 is conducted from the top one of said passages by a pipe 14 to the top one of the other series of passages 9 through which it descends. The lower one in the series of descending passages 9 connects with a three-way valve 15 through which the heated water may be drawn off or distributed in any required direction, as hereinafter explained.

In addition to the water-heating passages 8 and 9 the heater 7 comprises two oppositely-placed Bunsen gas-burners 16 located opposite the outer ends of laterally extended or horizontal flues 17, which communicate with the central vertical flue 12 of the heater and that alternate with the water circulating and heating passages already described.

Each Bunsen burner is provided with a gas-supply pipe 18, having branches 19 immediately connecting with the burner and arranged so as to distribute the gas to the multiple nipples or jets 20 therein. The pipes 18 are supplied from a pipe 21, connecting with the gas-service or distribution pipes in a building. In each Bunsen burner are numerous air-passages 22 for supplying the air required to produce a high temperature when the gas is ignited.

The arrangement of the Bunsen burners 16 in vertical planes, as shown, opposite to each other and at the ends of the horizontal flues 17 affords the advantage of a strong draft through the central flue 12 of the heater. The flames from the Bunsen burners are thrown onto the water-circulating passages and into the flues between them, and the water is thus rapidly brought to the required temperature.

The heater 7 is surrounded by a metallic casing 23, the upper portion of which may be constructed to act as a reflector for reflecting heat down onto the body of water heating and circulating passages 8 and 9, or a specially-constructed reflector 24 may be placed in the top of the heater. In a heater of this construction the filtered water supplied to the circuitous shallow passages 8 and 9 will be rapidly and economically raised to a high temperature, even to the making of steam, if desired. The device is especially useful for the rapid heating of water in bath-rooms and for pharmaceutical and other purposes, domestic or otherwise, and in a variety of places. From the three-way valve 15 a pipe or connected series of pipes 25 may lead to a distributing-tank 26 having an outlet-pipe 27 conveying filtered and purified water to the elevated parts of a building. The distributing-tank 26 may also have an inlet-pipe 28, controlled by a cock or valve 29, for conducting cold water from the pipe 6 to said tank 26 whenever desired, thus affording means for supplying either hot or cold filtered water to the upper stories of a building, from said distributing-tank 26, as may be required.

Hot water may be taken from the three-way valve 15 through a pipe 30 leading to any required point.

If desired, the pipe 30 may be provided with a branch pipe 31, furnished with a cock 32 and leading to a water refrigerating or cooling device comprising a worm or coiled pipe 33 inclosed in a vessel 34 that may contain ice or other suitable refrigerating material. A faucet 35, connected with the lower end of the worm 33, affords means for drawing off filtered, purified, and cooled water as required.

By the filtration of the water and its immediate heating to a high temperature its impurities are removed or destroyed and the water thereby better fitted for culinary or drinking purposes and other uses that may be required. The filtration of the water also renders it less liable to form a scale within or otherwise injure the water-circulating passages of the heater.

The heater is so constructed that, by reason of the shallow and largely-extended circulating-passages, the water can be very rapidly and economically heated, which is often an important object. The apparatus also affords a means for the distillation of water for medicinal or pharmaceutical purposes, if desired.

The apparatus is portable and may be readily fitted in position for the various purposes to which it is adapted.

What I claim as my invention is—

1. In a water-heater, the combination of an ascending series of shallow and circuitous water circulating and heating passages, receiving water at the bottom, a descending series of shallow and circuitous water circulating and heating passages communicating with the top of the said ascending series to receive water therefrom, the said descending series being provided with an outlet at the bottom, the said two series of water circulating and heating passages being spaced apart to provide a central vertical flue and series of horizontal flues, the Bunsen gas-burners arranged in vertical planes opposite each other and at the outer ends of the horizontal flues, and an outer casing, substantially as described.

2. In a water-heater, the combination of the ascending and descending series of broad and shallow circuitous water heating and circulating passages, the central vertical flue and connected horizontal flues, and the Bunsen gas-burners located in vertical planes opposite each other at the outer ends of the horizontal flues and each of said burners connected with its gas-supply pipe by a number of branches for distribution of the gas throughout the gas-passages of the burner substantially as described.

3. In a water heating and purifying apparatus, the combination of a heater comprising vertical series of shallow and circuitous water-heating passages, a filter from which to supply water to said heater, a three-way valve through which water may be drawn off from the heater, and a distributing-tank and water-cooling device connecting with said valve, substantially as described.

4. In a water heating and purifying apparatus, the combination of a heater comprising vertical series of shallow and circuitous water-heating passages, a filter from which the heater is supplied with water, a distributing-tank supplied with hot water from the heater, and a valved pipe through which said tank may be supplied with water direct from the filter, substantially as described.

In testimony whereof I have hereunto set my hand in presence of two subscribing witnesses.

JOHN EDWARD PRUNTY.

Witnesses:
JAMES L. NORRIS,
GEO. W. REA.